US012344099B2

(12) United States Patent
Bray et al.

(10) Patent No.: US 12,344,099 B2
(45) Date of Patent: Jul. 1, 2025

(54) TRANSMISSION DEVICE AND WHEELED VEHICLE PROVIDED WITH SUCH A TRANSMISSION DEVICE

(71) Applicant: FRANCE REDUCTEURS, Les Herbiers (FR)

(72) Inventors: Sébastien Bray, Les Epesses (FR); Fabien Guiroult, Saint Hilaire le Vouhis (FR)

(73) Assignee: FRANCE REDUCTEURS, Les Herbiers (FR)

( * ) Notice: Subject to any disclaimer, the term of this patent is extended or adjusted under 35 U.S.C. 154(b) by 133 days.

(21) Appl. No.: 18/015,527

(22) PCT Filed: Jun. 23, 2021

(86) PCT No.: PCT/FR2021/051145
§ 371 (c)(1),
(2) Date: Jan. 10, 2023

(87) PCT Pub. No.: WO2022/018334
PCT Pub. Date: Jan. 27, 2022

(65) Prior Publication Data
US 2023/0256808 A1    Aug. 17, 2023

(30) Foreign Application Priority Data
Jul. 21, 2020   (FR) ..................................... 20 07662

(51) Int. Cl.
*B60K 7/00*       (2006.01)
*B60K 17/04*      (2006.01)
*F16H 1/22*       (2006.01)

(52) U.S. Cl.
CPC .......... *B60K 7/0007* (2013.01); *B60K 17/043* (2013.01); *F16H 1/22* (2013.01);
(Continued)

(58) Field of Classification Search
CPC ................ B60K 7/0007; B60K 17/043; B60K 2007/0038; B60K 2007/0061
See application file for complete search history.

(56) References Cited

U.S. PATENT DOCUMENTS

| 2011/0139522 | A1 | 6/2011 | Takenaka et al. |
| 2011/0177903 | A1* | 7/2011 | Campbell ............ B60K 7/0007 475/182 |

(Continued)

FOREIGN PATENT DOCUMENTS

| CN | 110 239 326 | 9/2019 |
| EP | 2 332 760 | 6/2011 |

OTHER PUBLICATIONS

International Search Report dated Apr. 8, 2021.

*Primary Examiner* — Erez Gurari
(74) *Attorney, Agent, or Firm* — IPSILON USA, LLP

(57) ABSTRACT

The invention relates to a transmission device (1) comprising a housing (2), two electric motors (3) arranged outside the housing (2) and each provided with a motor shaft (4) projecting at least partially into the housing (2), an output shaft (5) formed by at least two shaft sections (51, 52) which are coaxial and mounted freely rotatable relative to one another, a motion transmission mechanism (6) configured to transmit the rotational motion of one of the motor shafts (4) to one of the shaft sections (51, 52) of the output shaft (5) and the rotational motion of the other of the motor shafts (4) to the other of the shaft sections (51, 52) of the output shaft (5), the transmission mechanism (6) and the output shaft (5) being housed at least partially within the housing (2). The housing (2) is made of synthetic material, the motors (3) are connected to one another by at least one connecting element (7) forming a bridge and the transmission device (1) comprises at least one stop (8) for limiting the rotational movement of the assembly formed by the motors (3) and the (Continued)

connecting element(s) (7) about an axis parallel to at least one of the motor shafts (4).

10 Claims, 9 Drawing Sheets

(52) U.S. Cl.
CPC ............... *B60K 2007/0038* (2013.01); *B60K 2007/0061* (2013.01); *B60Y 2200/223* (2013.01); *B60Y 2410/10* (2013.01)

(56) References Cited

U.S. PATENT DOCUMENTS

| | | | |
|---|---|---|---|
| 2016/0076625 A1* | 3/2016 | Guiroult | F16H 63/067 |
| | | | 474/8 |
| 2017/0313181 A1* | 11/2017 | Isono | B60K 17/02 |
| 2018/0118023 A1 | 5/2018 | Makino et al. | |
| 2019/0331200 A1 | 10/2019 | Barendrecht | |
| 2020/0180426 A1* | 6/2020 | Chopra | B60K 17/22 |
| 2022/0320946 A1* | 10/2022 | Varela | H02K 7/006 |
| 2022/0410871 A1* | 12/2022 | Takeda | B60W 10/08 |
| 2023/0256808 A1* | 8/2023 | Bray | B60K 17/043 |
| | | | 180/65.51 |
| 2023/0271592 A1* | 8/2023 | Bray | F16D 65/22 |
| | | | 180/370 |
| 2025/0001852 A1* | 1/2025 | Lenon | B60K 17/16 |
| 2025/0010698 A1* | 1/2025 | Laihonen | B60K 17/043 |

\* cited by examiner

[Fig. 1]
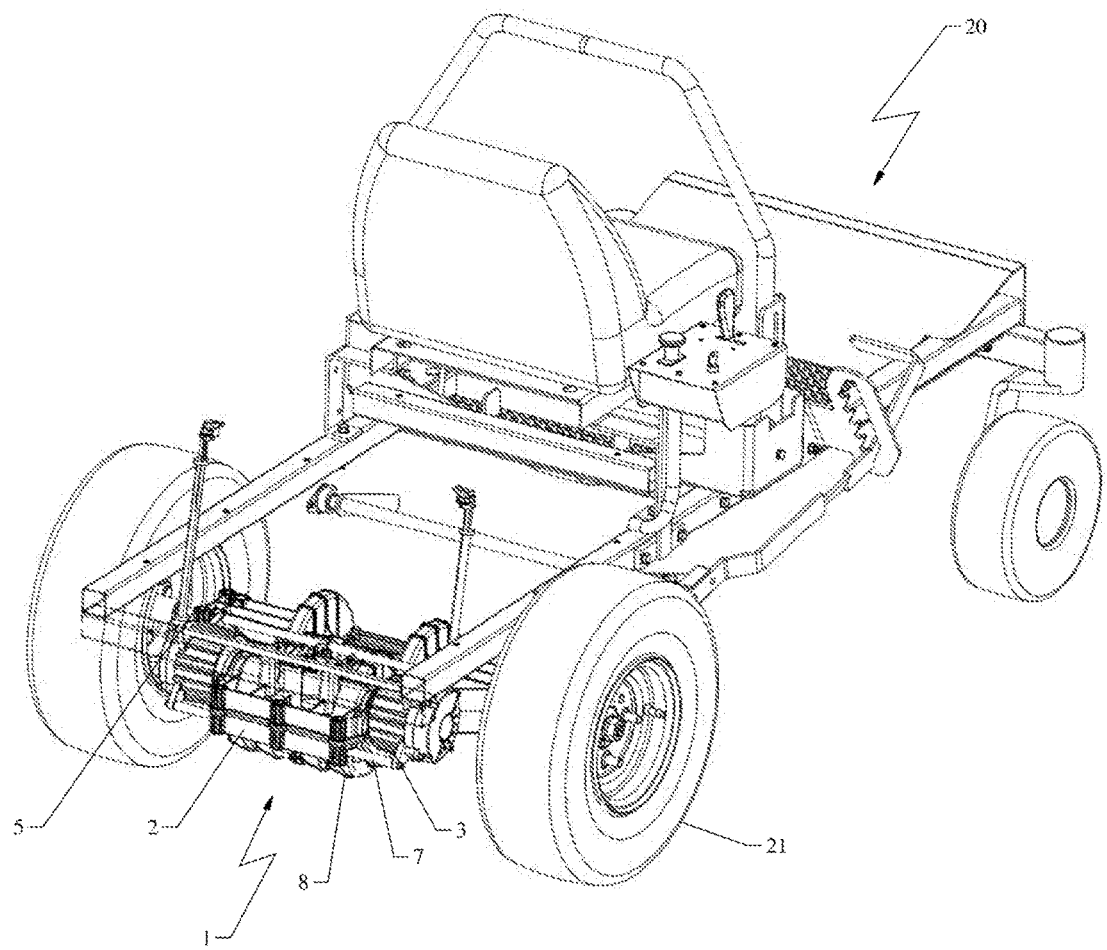

[Fig. 2]
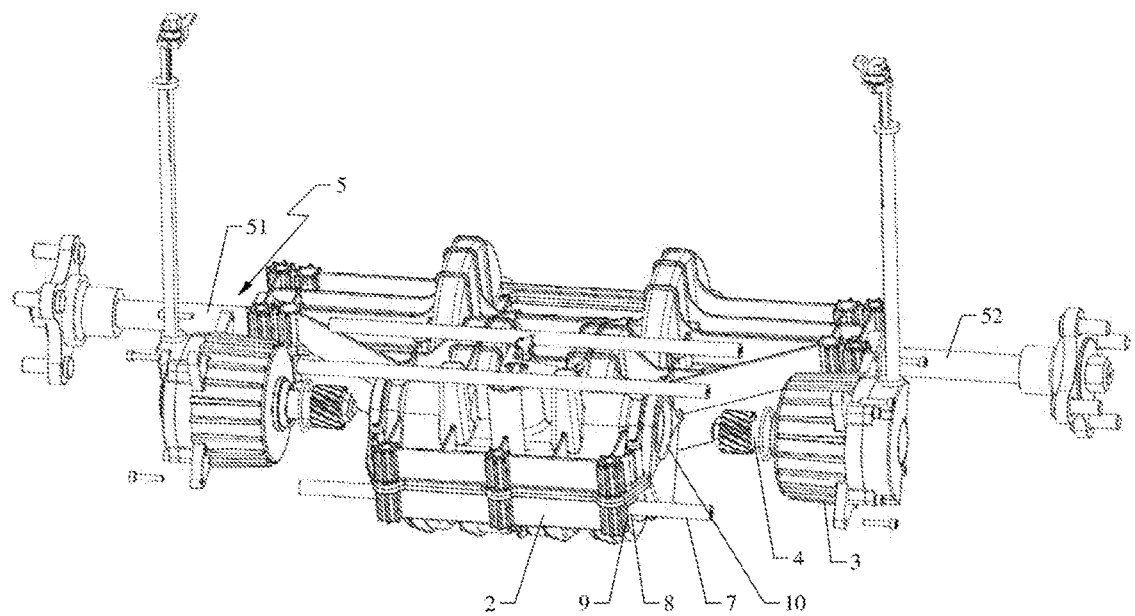

[Fig. 3]
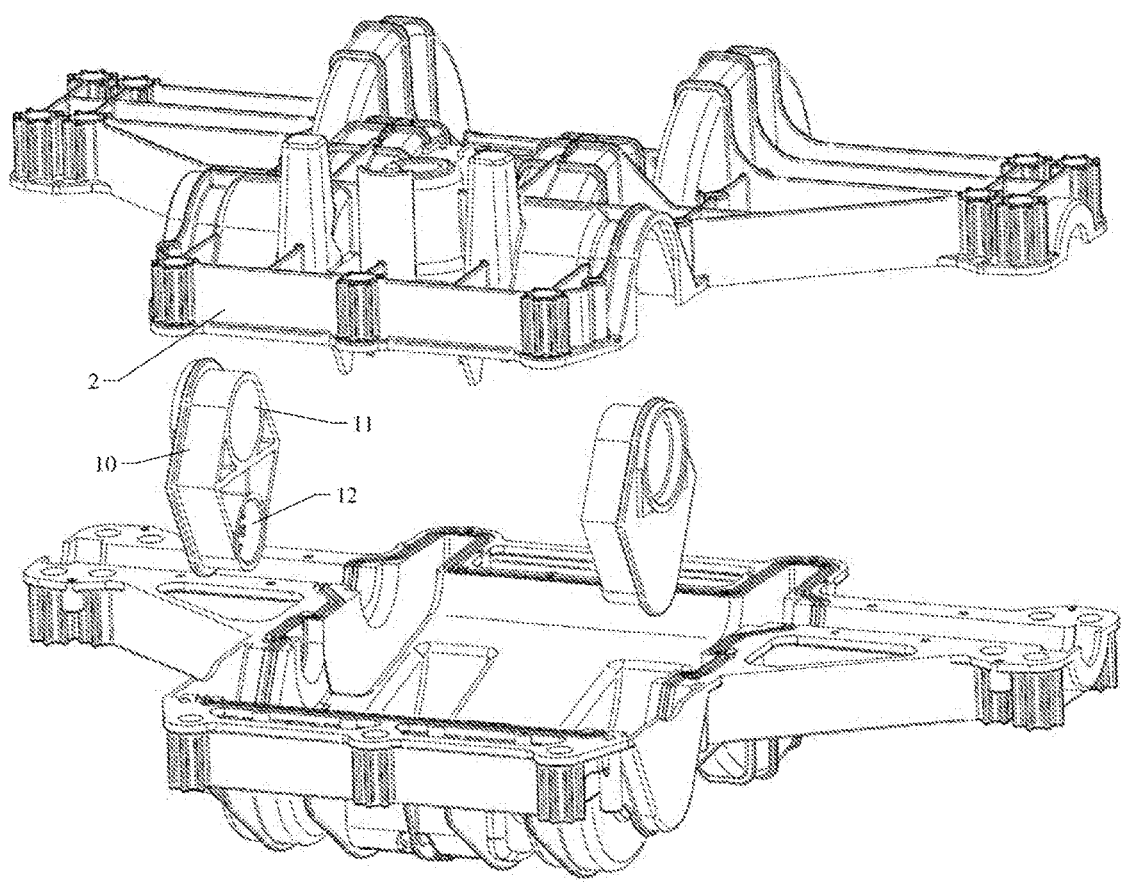

[Fig. 4]
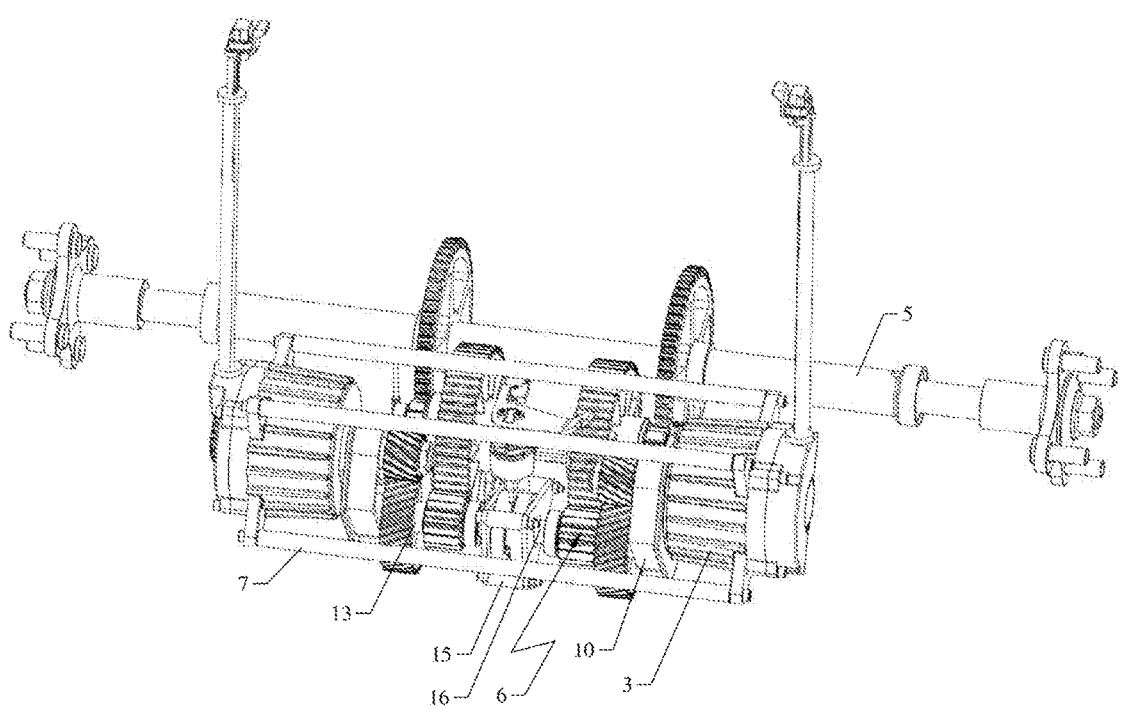

[Fig. 5]
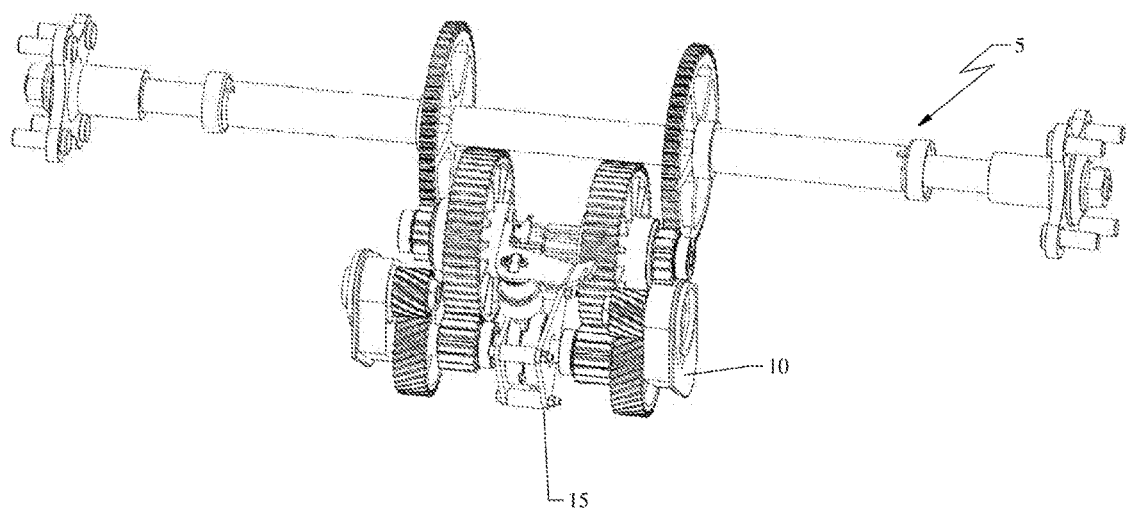

[Fig. 6]
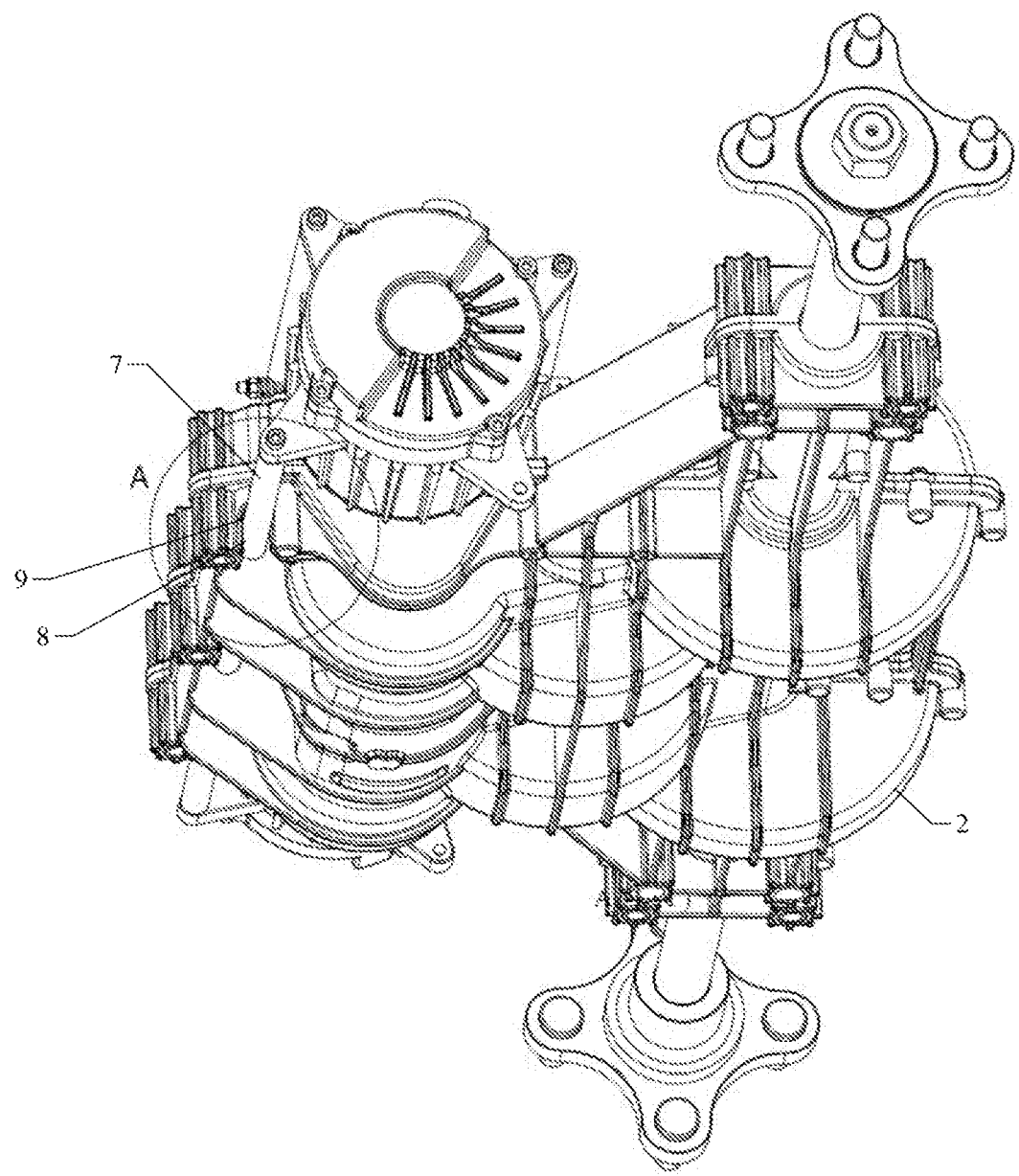

[Fig. 7]
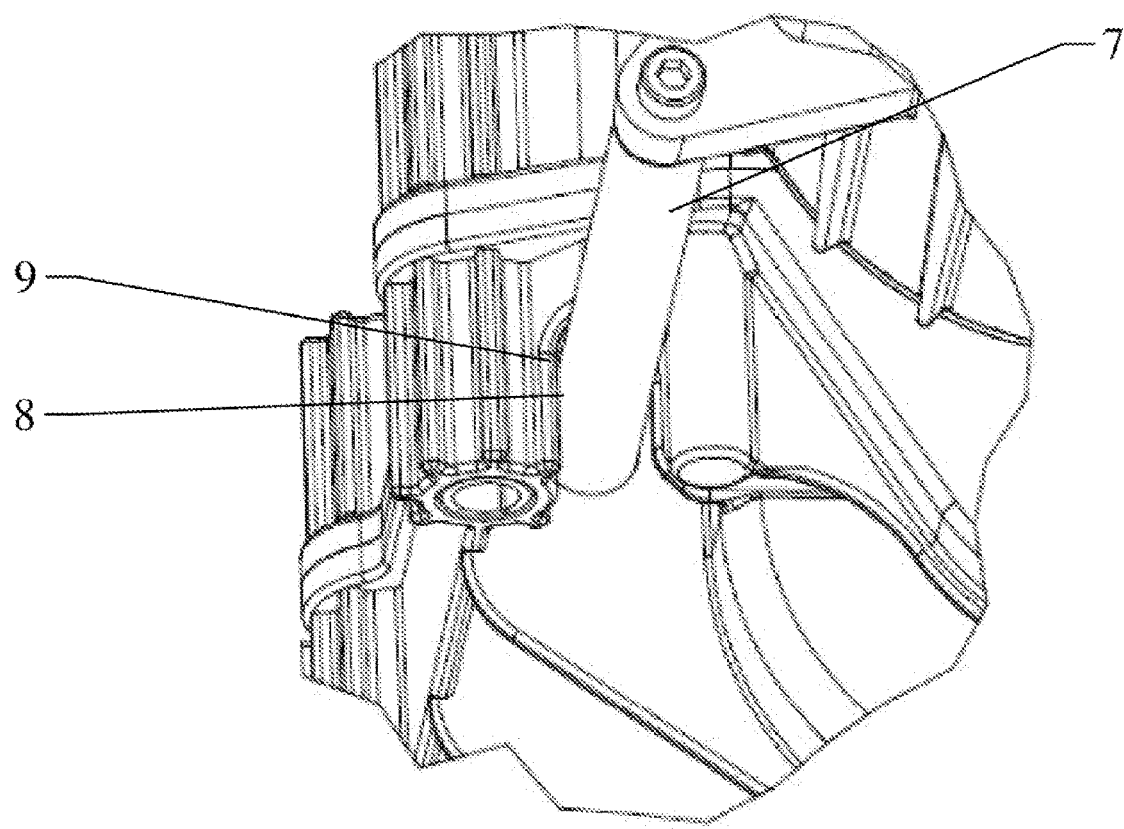

[Fig. 8]
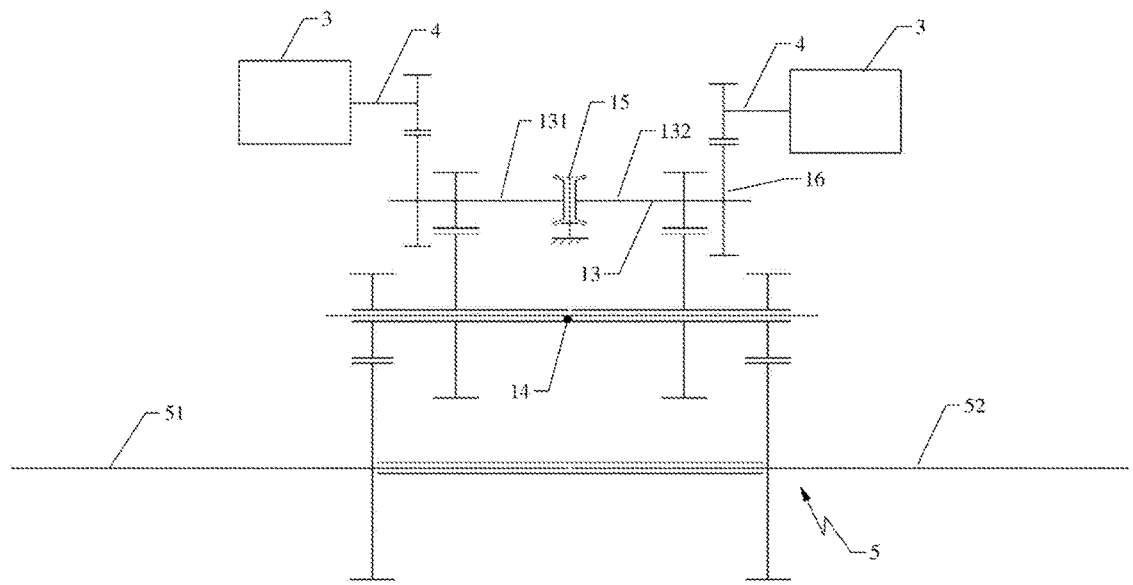
[Fig. 9]
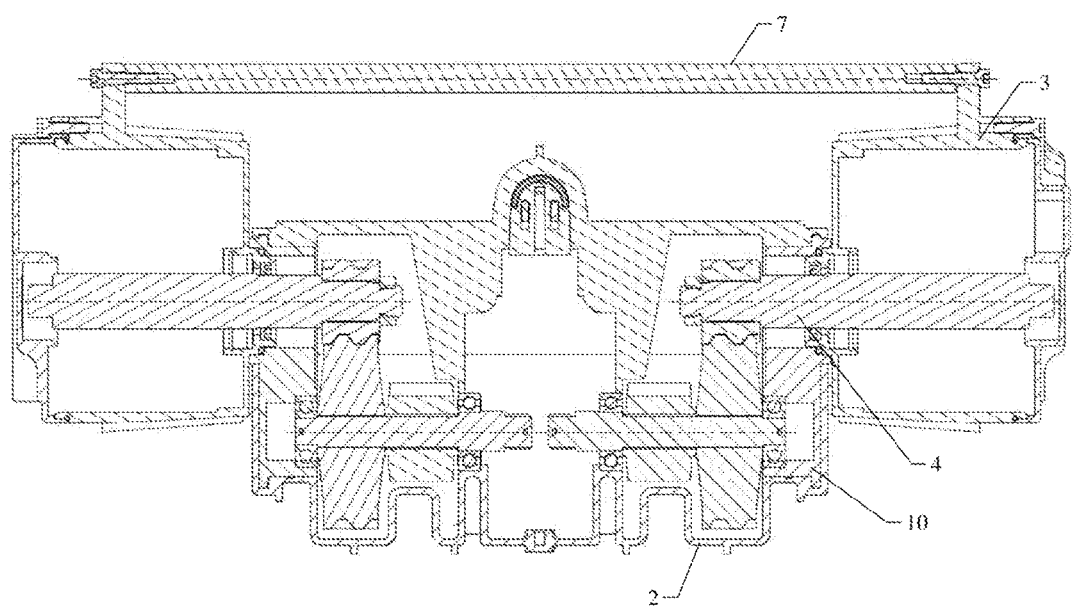

[Fig. 10]
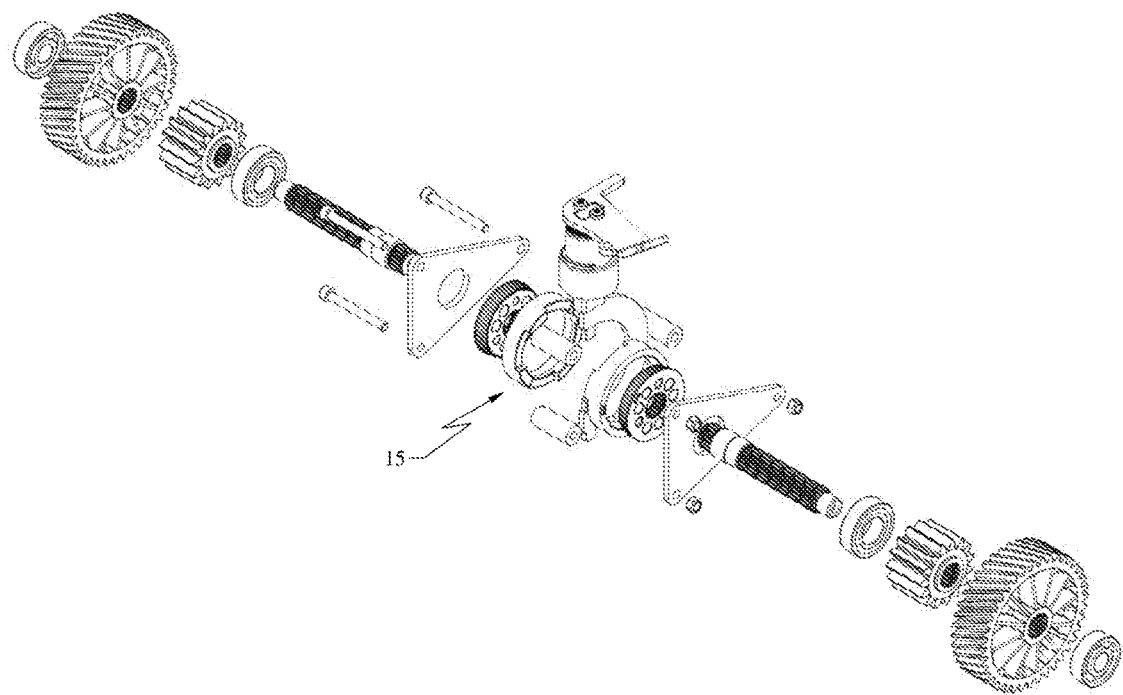

TRANSMISSION DEVICE AND WHEELED VEHICLE PROVIDED WITH SUCH A TRANSMISSION DEVICE

RELATED APPLICATION

This application is a National Phase of PCT/FR2021/051145 filed on Jun. 23, 2021, which claims the benefit of priority from French Patent Application No. 20 07662, filed on Jul. 21, 2020, the entirety of which are incorporated by reference.

FIELD OF THE INVENTION

The present invention relates to a transmission device, in particular for rotating the wheels of a wheeled vehicle, and to a wheeled vehicle provided with such a transmission device.

It particularly relates to a transmission device comprising a housing, two electric motors positioned outside the housing and each provided with a drive shaft protruding inside the housing, an output shaft made up of at least two coaxial shaft sections mounted free to rotate relative to each other, a mechanism for transmitting motion configured to transmit the rotational motion of one of the drive shafts to one of the shaft sections of the output shaft and the rotational motion of the other drive shaft to the other or another shaft section of the output shaft, the transmission mechanism and the output shaft being at least partially accommodated inside the housing.

PRIOR ART

Such a transmission device is known, as illustrated by FR-3.053.007. Such a transmission device applies more particularly to utility vehicles, in particular to mower vehicles with zero turning circle, also known as zero turn or ZT vehicles. The presence of two electric motors and the production of an output shaft in at least two sections make it possible to provide a vehicle with two driving wheels that can be rotated at different speeds and in different directions. The vehicle can thus be steered simply by changing the rotation speed of the wheels. In practice, such a vehicle is often provided with two control levers that each control one motor. When the two levers are pushed forward simultaneously with the same force, the vehicle travels forward. When the two levers are pushed backward simultaneously with the same force, the vehicle travels backward, and when one lever is pushed more than the other, the vehicle performs a turn. Pushing one lever forward and the other backward makes it possible to turn the vehicle on itself. A transmission device for such a vehicle is characterized by its weight, footprint, and complexity. Solutions are therefore constantly being sought in order to limit the footprint of such a transmission device and to reduce the weight thereof.

OBJECTS AND SUMMARY

One aim of the invention is to propose a transmission device as described above, the design of which makes it possible to reduce the weight of said device without detracting from its mechanical strength and operation.

To this end, the invention relates to a transmission device, in particular for rotating wheels of a wheeled vehicle, said device comprising a housing, two electric motors positioned outside the housing and each provided with a drive shaft at least partially protruding inside the housing, an output shaft made up of at least two coaxial shaft sections mounted free to rotate relative to each other, a mechanism for transmitting motion configured to transmit the rotational motion of one of the drive shafts to one of the shaft sections of the output shaft and the rotational motion of the other drive shaft to the other or another shaft section of the output shaft, the transmission mechanism and the output shaft being at least partially accommodated inside the housing, characterized in that the housing is at least partially made from a synthetic material, in that the motors are connected to each other by at least one add-on connecting element extending from one motor to the other to form a connecting bridge between said motors, and in that the transmission device comprises at least one stop for limiting the rotational movement of the assembly formed by the motors and the connecting element(s) about an axis parallel to at least one of the drive shafts. The presence of one or more connecting elements separate from the housing and forming a bridge between the motors makes it possible to avoid or limit the fastening of the motors to the housing, while ensuring that the drive shafts remain parallel.

According to one embodiment of the invention, the or at least one of the stops is formed by at least part of the housing against which the or at least one of the connecting elements is able to rest. This results in simple construction.

According to one embodiment of the invention, the housing is provided with one or more through-passages through which the or at least one of the connecting elements can pass, and the or at least one of the stops is formed by at least part of a surface defining the or at least one of the passages.

According to another embodiment of the invention, the or at least one of the connecting elements takes the form of a connecting rod. The motors positioned outside the housing remain easy to remove due to the design of the connecting element(s). Maintenance is therefore easy.

According to one embodiment of the invention, the drive shafts are coaxial with or parallel to each other. The connecting element(s) make(s) it possible to keep them coaxial or parallel.

According to one embodiment of the invention, the motion transmission mechanism is a geared motion transmission mechanism. This design ensures that the motion transmission is reliable and simple.

According to one embodiment of the invention, the motion transmission mechanism comprises a so-called split intermediate shaft having a first section to which the rotational motion of one of the drive shafts can be transmitted and a second section to which the rotational motion of the other of said drive shafts can be transmitted, and the housing comprises, level with each drive shaft, accommodated inside the housing, a part provided with at least two openings, one of which forms a support bearing for said drive shaft and the other a support bearing for one of the sections of the split intermediate shaft of the motion transmission mechanism. The presence of a part with two openings level with each drive shaft makes it possible to increase the accuracy of the positioning of the drive shafts relative to the motion transmission mechanism with which the housing is provided.

According to one embodiment of the invention, the first section and the second section of the intermediate shaft are each configured to transmit their rotational motion to one of the shaft sections of the output shaft directly or via at least one section of an additional split intermediate shaft.

According to one embodiment of the invention, the device comprises a braking device accommodated inside the housing and mounted on a rotating shaft. Such a braking device can make it possible to simultaneously brake the shaft sections or at least two of the shaft sections of the output shaft.

The invention further relates to a wheeled vehicle provided with wheels and with a device for rotating wheels of said vehicle, characterized in that the device for rotating wheels is as described above.

BRIEF DESCRIPTION OF THE DRAWINGS

The invention will be clearly understood on reading the following description of embodiments, with reference to the appended drawings, in which:

FIG. 1 shows a perspective view of a wheeled vehicle provided with a transmission device according to the invention;

FIG. 2 shows a partial perspective view in a partially assembled state of a transmission device according to the invention;

FIG. 3 shows a partial perspective view of the housing of a transmission device according to the invention in the open state of the housing;

FIG. 4 shows a partial perspective view of the elements of a transmission device according to the invention, with the housing omitted for clarity;

FIG. 5 shows a partial perspective view of the elements of a transmission device according to the invention, with the housing omitted for clarity;

FIG. 6 shows a perspective view of a transmission device according to the invention;

FIG. 7 shows a view of detail A in FIG. 6;

FIG. 8 shows a schematic flat view of the transmission of motion between the motor and the output shaft of a transmission device according to the invention;

FIG. 9 shows a partial cross-sectional view of a transmission device according to the invention;

FIG. 10 shows an exploded perspective view of the elements forming the braking device and the associated rotating shaft.

DETAILED DESCRIPTION

The transmission device 1 to which the invention relates is more particularly capable of allowing the rotation of the wheels 21 of a wheeled vehicle 20. This wheeled vehicle 20 can be as shown in FIG. 1. Here, the wheeled vehicle 20 is a wheeled mower vehicle having four wheels with two rear driving wheels, which are rotated using the transmission device 1 to which the invention relates. This wheeled vehicle 20 is a so-called ZT (zero turn) vehicle, since the driving wheels can be controlled using the transmission device 1 described below and two control levers provided on said vehicle. Due to these control levers and the design of the transmission device 1, the driving wheels can be rotated in different directions and at different rotation speeds by actuating said control levers as set out in the introduction and as conventional for this type of vehicle.

The transmission device 1, which can also be referred to as a transaxle, therefore comprises a housing 2 that can be positioned between the wheels of the vehicle to be rotated by said transmission device 1. This housing 2 is at least partially made from a synthetic material. In the example shown, this housing 2 is made from glass-fiber-reinforced polyamide.

This housing 2 is made up of two shells assembled along a parting plane, as illustrated in FIG. 3. In the closed state, that is, the assembled state of the shells, this housing 2 defines an enclosure inside which a number of elements are at least partially accommodated. In particular, an output shaft 5, which here forms the shaft for driving the wheels, in particular the rear wheels 21 of the vehicle 20, is partially accommodated inside the cavity delimited by the housing 2.

In the examples shown, this output shaft 5 is made up of two coaxial shaft sections 51, 52 mounted free to rotate relative to each other. These two shaft sections 51 and 52 are connected to each other by a sleeve, as illustrated in FIG. 8, in order to permit such independent rotation.

In order to make it possible for each shaft section 51, 52 of the output shaft 5 to be rotated at different rotation speeds and in different rotation directions, the transmission device 1 to which the invention relates comprises two electric motors 3 positioned outside the housing 2. Each electric motor 3 is a two-way motor. Each electric motor 3 is controlled by the driver of the vehicle using a control lever provided on the vehicle as illustrated in FIG. 1, in which one of the two control levers controlling one of the motors and the other controlling the other motor can be seen. These two levers are actuated as described above for zero turn wheeled vehicles. Each electric motor 3 is provided with a drive shaft 4 partially protruding inside the housing 2 through an opening in the housing 2 made on the parting plane of said housing 2. These drive shafts 4 are coaxial with or parallel to each other.

In the example shown, in the state in which they are associated with the housing 2, the drive shafts 4 are positioned coaxially and the openings in the housing through which the drive shafts 4 protrude extend facing each other.

The transmission device 1 further comprises a motion transmission mechanism 6 configured to transmit the rotational motion of one of the drive shafts 4 to one of the shaft sections of the output shaft 5 and the rotational motion of the other drive shaft 4 to the other or another of the shaft sections of the output shaft 5. These shaft sections are labelled 51 and 52 in the figures. The motion transmission mechanism 6, like the output shaft 5, is at least partially accommodated inside the housing 2.

In the examples shown, the motion transmission mechanism 6 is a geared motion transmission mechanism. This motion transmission mechanism 6 comprises a so-called split intermediate shaft having a first section 131 to which the rotational motion of one of the drive shafts 4 can be transmitted and a second section 132 to which the rotational motion of the other of said drive shafts 4 can be transmitted.

The housing 2 further comprises, level with each drive shaft 4, accommodated inside the housing 2, a part 10 provided with at least two openings, one of which, labelled 11 in the figures, forms a support bearing for said drive shaft 4 and the other of which, labelled 12 in the figures, forms a support bearing for one of the sections of the split intermediate shaft 13 of the motion transmission mechanism 6. This part 10 is again made from a synthetic material. This part 10 is held inside the housing 2 by cooperation of shapes between the part 10 and the housing 2. Here, this part 10 is in the form of a plate with one of the openings made in the form of a blind opening and the other in the form of a through-opening. This part 10 is held inside the housing 2 by cooperation of shapes between the part 10 and the housing 2. For example, the inside of the housing 2 can thus be provided with a slot for each part 10, inside which the part 10 is partially nested.

In the examples shown, the transmission mechanism 6 comprises an additional split intermediate shaft 14 interposed between the intermediate shaft 13 to which the rotational motion of the drive shafts 4 is transmitted and the output shaft 5. The first section 131 and the second section 132 of the intermediate shaft 13 are thus configured to transmit their rotational motion to one of the shaft sections of the output shaft 5 via at least one section of the additional split intermediate shaft 14.

As a variant, the first section 131 and the second section 132 of the intermediate shaft 13 could be configured to transmit their rotational motion directly to one of the shaft sections of the output shaft. Thus, as illustrated in FIG. 8, one of the drive shafts transmits its rotational motion to the first section 131 of the intermediate shaft 13. This first section 131 transmits its rotational motion to a section of the additional shaft 14, and this section of the additional shaft 14 in turn transmits its motion to the shaft section 51 of the output shaft 5. Transmission occurs in a similar way with the other drive shaft 4 and the second section 132 of the intermediate shaft 13 and the second section of the additional intermediate shaft 14 and the shaft section 52 of the output shaft 5.

FIG. 8 shows the details of this transmission mechanism, which can take many forms, in particular as a function of the number of reduction stages supplied. In the example shown, the drive shaft 4 of each motor 3 is provided with a sprocket. This sprocket engages by meshing with a sprocket held by a section of the intermediate shaft 13. This intermediate shaft section in turn holds a sprocket that is permanently engaged by meshing with a sprocket held by a section of the additional split intermediate shaft 14. This additional intermediate shaft 14 holds a sprocket that is permanently engaged with a section of the output shaft 5. Because the intermediate shafts or additional intermediate shafts are produced in the form of sections, the drive shaft 4 of one of the motors 3 transmits its rotational motion to one of the sections, for example the shaft section 51, of the output shaft, independently of the drive shaft 4 of the other motor 3, which in turn transmits its rotational motion to the other section, for example the shaft section 52, of the output shaft 5.

In order to ensure optimum transmission of motion, the motors 3 are connected to each other by at least one add-on connecting element 7, separate from the housing 2. The or each connecting element extends from one motor to the other and forms a connecting bridge between said motors. This or these connecting element(s) 7 ensure that the drive shafts 4 remain parallel or coaxial without applying excessive stress to the housing 2. In the example shown, a plurality of connecting elements is provided, in this case three connecting elements. Each connecting element 7 takes the form of a connecting rod. This rod extends parallel to the drive shafts 4 and is fastened at each end by screwing to a radial lug of a motor. Each motor is thus provided with at least three circumferentially offset radial lugs and the three rods extend parallel to each other around said motors 3. In order to improve the relative holding of the motors 4, the transmission device 1 further comprises at least one stop 8 for limiting the rotational movement of the assembly formed by the motors 3 and their connecting elements 7 about an axis parallel to at least one of the drive shafts 4.

In the examples shown, each of the stops 8 is formed by at least part of the housing 2 against which the or at least one of the connecting elements 7 is able to rest. In particular, the housing 2 is provided with a plurality of aligned through-passages 9 through which a connecting rod can be inserted, as illustrated in FIG. 6. These passages can be produced in the form of holes or slots in the housing 2. Each stop 8 is thus formed by at least part of a surface defining the or at least one of the passages 9.

In order to improve the assembly, the device 1 for transmitting motion comprises a braking device 15 accommodated inside the housing 2 and mounted on a rotating shaft 16. In the examples shown, the braking device 15 comprises two brakes. Each brake is a cone brake comprising two substantially coaxial parts with conical surfaces surrounding the shaft 16 provided with the braking device and one of which, referred to as the male cone, is rigidly connected to one of the shaft sections of said shaft provided with the braking device for rotation therewith and the other of which, referred to as the female cone, is rotatably fixed relative to said shaft.

In order to rigidly connect it to one of the sections of the shaft provided with the braking device 15 for rotation therewith, the central orifice of each male cone is provided with axial splines suitable for interacting with complementary splines made on said shaft section.

In the examples shown, the female cone of one of the brakes and the female cone of the other brake take the form of a wheel with an axial bore with a conical bearing surface. The male cone of one the brakes and the male cone of the other brake, which are preferably generally frustoconical, have central orifices so that one can be threaded onto one of the shaft sections and the other onto the other shaft section of the shaft 16 provided with the braking device 15.

The relative axial movement together or apart of the female cone and the male cone of one of the brakes, and the female cone and the male cone of the other brake, is controlled by means of a control member. Each time, in the closed position of the male and female cones corresponding to the active state of the brake, the male cone is accommodated inside the axial bore of the female cone with its conical outer peripheral surface engaged by bearing contact with the conical bearing surface of the female cone.

The inactive state of the brake corresponds to the separated position of the male and female cones of the brake. The control member for moving the brakes in order to separate them from each other to switch the brakes from an active state to an inactive state is common to the two brakes. This control member is positioned between the brakes and movably mounted between an inactive position and an active braking position in order to switch the brakes from an inactive state to an active state.

In the examples shown, the control member is an angular movement control member that takes the form of a two-pronged fork. Each prong of the fork is provided with an inner radial tooth forming the active control part of the common control member. The wheels forming the female cones have teeth forming a circular crenellation on their opposite faces. These teeth of said crenellations are interleaved, forming between them a free space for inserting the active control part of the common control member.

In the example shown, the body of the fork is C- or U-shaped. The prongs of said control member are formed by the region adjacent to the free ends of the C or the prongs of the U. Each time, these prongs are provided with an inner radial tooth capable of being accommodated in the free space between the flanks of two teeth of the crenellations borne respectively by one and the other of the female cones.

In the examples shown, the fork is only provided with two inner radial teeth positioned diametrically opposite each other on the control member. Here, these inner radial teeth extend axially and outside said control member in order to form two shaft sections with a square or circular cross-section. These shaft sections are suitable for being accommodated inside bearings made in the housing 2.

The control member can be rotated by means of a control lever positioned outside the housing and engaging with one of the prongs of said control member. The angular movement of the control member causes the separation of the female cones. This separation is obtained by the engagement of the active surfaces of the inner radial teeth of the control member along the flanks of the teeth of the crenellations of the female cones. It will be noted that the axis of rotation of the control member permitting the angular movement thereof extends substantially orthogonally to the axis about which the conical surfaces of the male and female cones are coaxially positioned, this second axis corresponding to the axis of rotation of the shaft 16 provided with the braking device 15.

The braking device 15 further comprises two stops mechanically coupled to each other and surrounding said brakes. These stops form limit stops limiting the movement of the brakes away from each other in the active braking position of the control member. These stops form an assembly mounted so that it can move axially along the shaft provided with the braking device. This assembly is rotatably separate from said shaft 16. The shaft 16 provided with the braking device 15 can thus rotate without the assembly formed by the stops rotating.

This assembly formed by the stops can be mounted rotatably fixed or limited in its angular movement inside the housing 2 relative to the shaft 16 of the braking device 15.

Regardless of their design, in the coupled state, the stops define between them a gap with a fixed maximum length. These stops are coupled to each other by means of screw/nut connecting members and held apart by spacers mounted on the connecting members. The spacers can take the form of simple sleeves. The screw forming the coupling member passes through each sleeve. The stops each take the form of a plate provided with a through-hole so that the shaft 16 provided with the braking device 15 can pass through them. Here, the plates are triangular. Each spacer therefore extends between the plates. In the case of a spacer in the form of a sleeve, each end of the sleeve can be in bearing contact with the face of the plate opposite the other plate. Cradle shapes are formed in the housing to partially surround the spacer sleeves and ensure that the assembly formed by the stops is prevented from rotating inside said housing.

The rotating shaft 16 provided with the braking device 15 is made up of at least two shaft sections each holding a brake. This rotating shaft 16 can be coincident with the output shaft 5 or with the intermediate shaft 13 or the additional intermediate shaft 14 of the motion transmission mechanism 6. It is this second solution that is illustrated. The rotating shaft 16 provided with the braking device 15 is coincident with the intermediate shaft 13 of the motion transmission mechanism 6.

The braking device 15 operates as follows. It is assumed that the shaft 16 provided with the braking device 15 is rotating and that each section of said shaft transmits its rotational motion to a section of the output shaft. It is assumed that the control member is in the inactive position. The driver of the vehicle therefore orders, from the control position, an angular movement of the control member. During this angular movement of the control member, the female cone of each brake tends to move closer to the associated male cone. In the extreme closed position, the conical surface of the male cone is, for each brake, in bearing contact with the conical bearing surface of the associated female cone. In this position, the conical surfaces of the male and female cones are in bearing contact so that the shaft 16 is braked. In order to allow the release of the brakes, the control member must simply be angularly moved in the opposite direction. It will be noted that switching from the braked position to the released position of the brakes and vice versa only involves the axial movement of the female cones by a few millimeters along the shaft 16.

In order to ensure the coordination of the operation of the electric motors 3 and the braking device 1, the electric motors 3 are associated with a control unit and the control unit is configured to control the switching from the on state to the off state of said electric motors as a function of the position of the control member for moving the brakes. When the driver of the vehicle acts to order the angular movement of the control member for moving the brakes in order to activate the brakes, a control signal is simultaneously sent to the control unit of the electric motors 3 to order the stopping of the electric motors 3. It will be noted that despite the compactness of the braking device, the wheels of the vehicle can be driven at different rotation speeds and braked.

The invention claimed is:

1. A transmission device, in particular for rotating wheels of a wheeled vehicle, said device comprising:
 a housing,
 two electric motors positioned outside the housing and each provided with a drive shaft at least partially protruding inside the housing,
 an output shaft made up of at least two coaxial shaft sections mounted free to rotate relative to each other,
 a mechanism for transmitting motion configured to transmit the rotational motion of one of the drive shafts to one of the shaft sections of the output shaft and the rotational motion of the other drive shaft to the other or another shaft section of the output shaft, the transmission mechanism and the output shaft being at least partially accommodated inside the housing,
 wherein the housing is at least partially made from a synthetic material, in that the motors are connected to each other by at least one add-on connecting element extending from one motor to the other to form a connecting bridge between said motors, and in that the transmission device comprises at least one stop for limiting the rotational movement of the assembly formed by the motors and the connecting element(s) about an axis parallel to at least one of the drive shafts.

2. The transmission device as claimed in claim 1, wherein the or at least one of the stops is formed by at least part of the housing against which the or at least one of the connecting elements is able to rest.

3. The transmission device as claimed in claim 1, the housing is provided with one or more through-passages through which the or at least one of the connecting elements can pass, and in that the or at least one of the stops is formed by at least part of a surface defining the or at least one of the passages.

4. The transmission device as claimed in claim 1, wherein the or at least one of the connecting elements takes the form of a connecting rod.

5. The transmission device as claimed in claim 1, wherein the drive shafts are of coaxial with or parallel to each other.

6. The transmission device as claimed in claim 1, wherein the motion transmission mechanism is a geared motion transmission mechanism.

7. The transmission device as claimed in claim 1, wherein the motion transmission mechanism comprises a so-called split intermediate shaft having a first section to which the rotational motion of one of the drive shafts can be transmitted and a second section to which the rotational motion of the other of said drive shafts can be transmitted, and in that the housing comprises, level with each drive shaft, accommodated inside the housing, a part provided with at least two openings, one of which forms a support bearing for said drive shaft and the other a support bearing for one of the sections of the split intermediate shaft of the motion transmission mechanism.

8. The transmission device as claimed in claim 7, wherein the first section and the second section of the intermediate shaft are each configured to transmit their rotational motion to one of the shaft sections of the output shaft directly or via at least one section of an additional split intermediate shaft.

9. The transmission device as claimed in claim 1, transmission comprises a braking device accommodated inside the housing and mounted on a rotating shaft.

10. A wheeled vehicle provided with wheels and a device for rotating wheels of said vehicle, wherein the device for rotating wheels is as claimed in claim 1.

\* \* \* \* \*